(12) United States Patent
Kim

(10) Patent No.: US 12,369,237 B2
(45) Date of Patent: Jul. 22, 2025

(54) AC DIRECT DRIVING CIRCUIT DEVICE FOR UNIFORMITY OF MULTI-CHANNEL LIGHT EMITTING DIODES

(71) Applicant: POINT TEK CO., LTD., Yongin-si (KR)

(72) Inventor: Jun Sik Kim, Yongin-si (KR)

(73) Assignee: POINT TEK CO., LTD., Yongin-si (KR)

( * ) Notice: Subject to any disclaimer, the term of this patent is extended or adjusted under 35 U.S.C. 154(b) by 0 days.

(21) Appl. No.: 18/555,471

(22) PCT Filed: Apr. 13, 2022

(86) PCT No.: PCT/KR2022/005328
§ 371 (c)(1),
(2) Date: Oct. 13, 2023

(87) PCT Pub. No.: WO2022/220568
PCT Pub. Date: Oct. 20, 2022

(65) Prior Publication Data
US 2024/0196495 A1 Jun. 13, 2024

(30) Foreign Application Priority Data
Apr. 16, 2021 (KR) .................. 10-2021-0050092

(51) Int. Cl.
*H05B 45/35* (2020.01)
(52) U.S. Cl.
CPC .................... *H05B 45/35* (2020.01)
(58) Field of Classification Search
CPC ........ H05B 45/35; H05B 45/46; H05B 45/48; H05B 45/52; H05B 45/54; H05B 45/325; H05B 45/345; H05B 45/3725
See application file for complete search history.

(56) References Cited

U.S. PATENT DOCUMENTS

| 7,081,722 B1 * | 7/2006 | Huynh | H05B 45/50 |
| | | | 315/200 A |
| 9,516,718 B2 * | 12/2016 | Jung | H05B 45/10 |

(Continued)

FOREIGN PATENT DOCUMENTS

| KR | 10-1997-0022710 A | 5/1997 |
| KR | 10-2014-0024277 A | 2/2014 |

(Continued)

OTHER PUBLICATIONS

International Search Report issued for PCT/KR2022/005328, dated Nov. 18, 2022.

(Continued)

*Primary Examiner* — Tung X Le
(74) *Attorney, Agent, or Firm* — Amanda M. Prose; Westman, Champlin & Koehler, P.A.

(57) ABSTRACT

AC (alternating current) direct driving circuit device for uniformity of multi-channel light emitting diodes includes: a power supply unit that applies AC voltage; a light emitting unit including a plurality of light emitting diodes which are connected in series and emit light by current according to the voltage applied by the power supply unit; a switch unit including a plurality of switch modules which are formed on a plurality of conductive lines connecting input nodes of two different light emitting diodes among the plurality of light emitting diodes and distribute an amount of the current flowing in each of the light emitting diodes by turning on or off according to an increase or decrease in the amount of the current; a distribution resistance unit including a plurality of distribution resistors for distributing the amount of the current; and a driving unit that controls the amount of the current flowing in each of the plurality of light emitting diodes by selectively connecting the current flowing in each (Continued)

of the plurality of light emitting diodes to at least one of the plurality of distribution resistors.

9 Claims, 12 Drawing Sheets

(56) References Cited

U.S. PATENT DOCUMENTS

| | | | |
|---|---|---|---|
| 10,299,324 B2* | 5/2019 | Mun | H05B 45/44 |
| 10,375,779 B2* | 8/2019 | Kim | H05B 45/56 |
| 2015/0054407 A1* | 2/2015 | Park | H05B 45/48 |
| | | | 315/122 |
| 2019/0132913 A1* | 5/2019 | Yoo | H05B 47/10 |

FOREIGN PATENT DOCUMENTS

| | | |
|---|---|---|
| KR | 10-2014-0137214 A | 12/2014 |
| KR | 10-2015-0113638 A | 10/2015 |
| KR | 10-2015-0134251 A | 12/2015 |
| KR | 10-2020-0021351 A | 2/2020 |

OTHER PUBLICATIONS

Written Opinion of the International Searching Authority issued for PCT/KR2022/005328, dated Nov. 18, 2022.

* cited by examiner

AC DIRECT DRIVING CIRCUIT DEVICE FOR UNIFORMITY OF MULTI-CHANNEL LIGHT EMITTING DIODES

CROSS-REFERENCE TO RELATED APPLICATION

This Application is a Section 371 National Stage Application of International Application No. PCT/KR2022/005328, filed Apr. 13, 2022 and published as WO2022/220568A2 on Oct. 20, 2022, in Korean, which claims priority to Korean Patent Application No. 10-2021-0050092 filed on Apr. 16, 2021, the contents of which are hereby incorporated by reference in their entirety.

TECHNICAL FIELD

The present disclosure relates to a light emitting diode (LED) driving device, and more specifically, to an alternating current (AC) direct driving circuit device for uniformity of multi-channel light emitting diodes.

BACKGROUND ART

In the case of the AC direct drive method, LEDs operate sequentially in response to an input voltage, which has excellent characteristics such as harmonics and power factor, and a separate inductor or condenser is not used, so it is simple and has a long lifespan. However, it has a disadvantage that the brightness of each LED is uneven since LED is turned on in different sections depending on the input voltage and the flowing current is also different. In particular, it is difficult to use it in a surface-light or bar-shaped luminaire with widely spread LEDs due to the difference in brightness of each part.

DETAILED DESCRIPTION OF INVENTION

Technical Problems

The objective of the present disclosure is to provide a multi-channel AC direct driving device that can provide uniform illuminance for each LED channel.

Technical Solution

AC (alternating current) direct driving circuit device for uniformity of multi-channel light emitting diodes, in accordance with a preferred embodiment of the present disclosure, comprises: a power supply unit that applies AC voltage; a light emitting unit including a plurality of light emitting diodes which are connected in series and emit light by current according to the voltage applied by the power supply unit; a switch unit including a plurality of switch modules which are formed on a plurality of conductive lines connecting input nodes of two different light emitting diodes among the plurality of light emitting diodes and distribute an amount of the current flowing in each of the light emitting diodes by turning on or off according to an increase or decrease in the amount of the current; a distribution resistance unit including a plurality of distribution resistors for distributing the amount of the current; and a driving unit that controls the amount of the current flowing in each of the plurality of light emitting diodes by selectively connecting the current flowing in each of the plurality of light emitting diodes to at least one of the plurality of distribution resistors.

The plurality of light emitting diodes include a first light emitting diode, a second light emitting diode, a third light emitting diode, and a fourth light emitting diode, and the light emitting unit includes: a first diode interposed between the first light emitting diode and the second light emitting diode; a second diode interposed between the second light emitting diode and the third light emitting diode; and a third diode interposed between the third light emitting diode and the fourth light emitting diode.

The plurality of switch modules include: a first switch module formed on a conductive line connecting an input node of the first light emitting diode and an input node of the third light emitting diode; a second switch module formed on a conductive line connecting the input node of the first light emitting diode and an input node of the second light emitting diode; and a third switch module formed on a conductive line connecting the input node of the third light emitting diode and an input node of the fourth light emitting diode.

In a first section where the voltage applied by the power supply is greater than a driving voltage of the first light emitting diode and less than a sum of the driving voltage of the first light emitting diode and a driving voltage of the second light emitting diode, the first switch module, the second switch module and the third switch modules are all turned on, so that the first light emitting diode and the second light emitting diode are connected in parallel, the third light emitting diode and the fourth light emitting diode are connected in parallel, and a first group including the first light emitting diode and the second light emitting diode and a second group including the third light emitting diode and the fourth light emitting diode are connected in parallel.

In a second section where the voltage applied by the power supply is greater than a sum of the driving voltages of the first light emitting diode and the second light emitting diode and less than a sum of the driving voltage of the first light emitting diode, the driving voltage of the second light emitting diode and a driving voltage of the third light emitting diode, the first switch module and the third switch modules are turned on and the second switch module is turned off, so that the first light emitting diode and the second light emitting diode are connected in series, the third light emitting diode and the fourth light emitting diode are connected in series, and the first group including the first light emitting diode and the second light emitting diode and the second group including the third light emitting diode and the fourth light emitting diode are connected in parallel.

In a third section where the voltage applied by the power supply is greater than a sum of the driving voltages of the first light emitting diode, the second light emitting diode and the third light emitting diode and less than a sum of the driving voltage of the third light emitting diode and a driving voltage of the fourth light emitting diode, the third switch module is turned on and the first switch module and the second switch modules are turned off, so that the first light emitting diode and the second light emitting diode are connected in series, the third light emitting diode and the fourth light emitting diode are connected in parallel, and the first group including the first light emitting diode and the second light emitting diode and the second group including the third light emitting diode and the fourth light emitting diode are connected in series.

In a fourth section where the voltage applied by the power supply is greater than a sum of the driving voltages of the first light emitting diode, the second light emitting diode, the third light emitting diode and the fourth light emitting diode, the first switch module, the second switch module and the third switch modules are all turned off, so that the first light emitting diode, the second light emitting diode, the third light emitting diode and the fourth light emitting diode are subsequently connected in series.

The distribution resistor unit includes a first distribution resistor and a second distribution resistor connected in parallel with each other to ground, and the driving unit controls the current flowing in each of the first light emitting diode, the second light emitting diode, the third light emitting diode, and the fourth light emitting diode to be selectively connected to at least one of the first distribution resistor and the second distribution resistor to control an amount of the current flowing in each of the first light emitting diode, the second light emitting diode, the third light emitting diode, and the fourth light emitting diode. Resistance values of the first distribution resistor and the second distribution resistor are the same.

The resistance value of the first distribution resistor is four times the resistance value of the second distribution resistor.

The driving circuit device further comprises a rectifier unit that rectifies the AC voltage and provides the rectified voltage to the light emitting unit.

Effect of Invention

According to the present disclosure, by changing the wiring relationship of the plurality of light emitting diodes according to the magnitude of the input voltage, the driving current flows to all the light emitting diodes to make all the light emitting diodes operate, and by controlling the amount of current flowing to the plurality of light emitting diodes through the plurality of distribution resistors, which are grounding resistors connected in parallel with the ground, the brightness of all the light emitting diodes can be made uniform.

MODE FOR CARRYING OUT THE INVENTION

Figure 1:
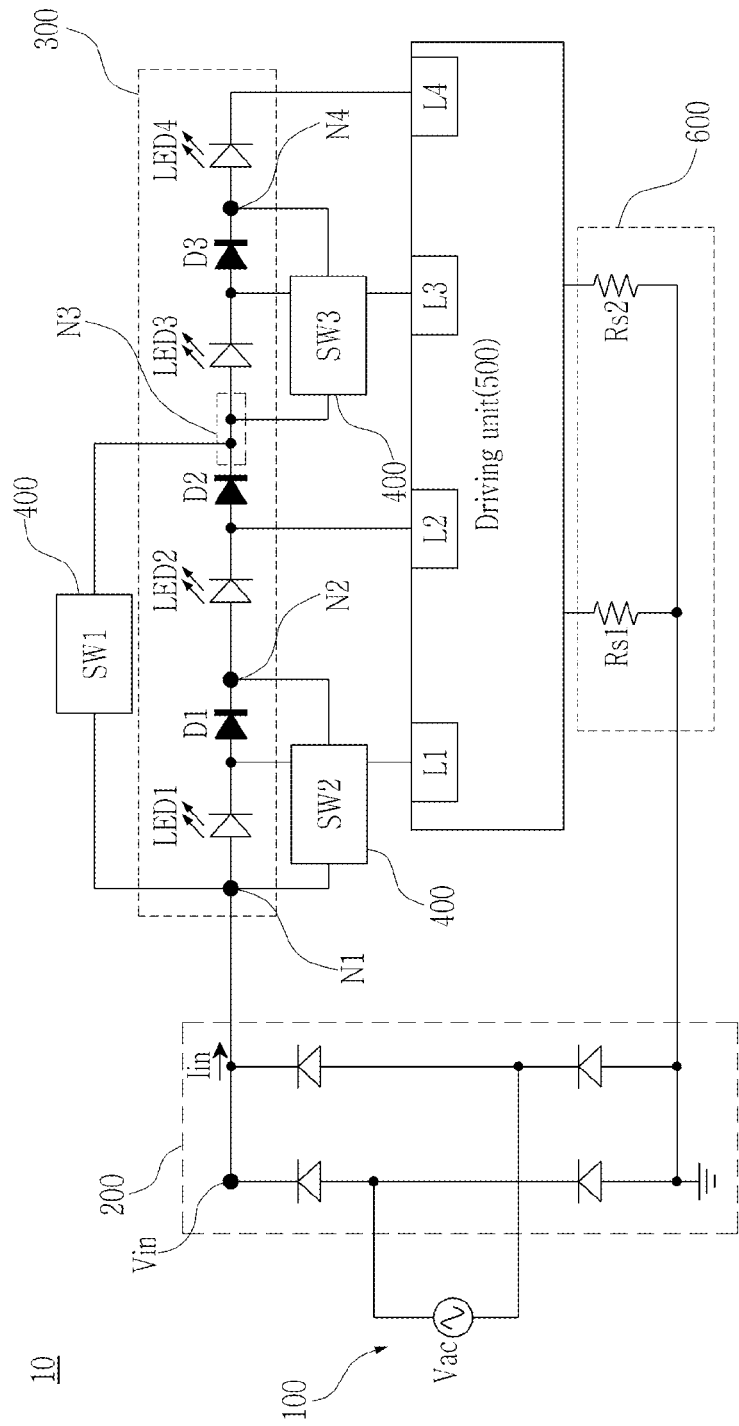
FIG. 1 is a diagram for explaining the configuration of an AC direct driving circuit device for uniformity of a multi-channel light emitting diode according to one embodiment of the present disclosure.

Prior to the detailed description of the present disclosure, the terms and words used in the specification and claims described below should not be construed as limited to their ordinary or dictionary meanings, and should be interpreted as meaning and concept consistent with the technical idea of the present disclosure based on the principle that the inventor can appropriately define the term as a concept to explain his/her disclosure in the best possible manner. In addition, the terms containing ordinal numbers, such as first, second, etc., are used to describe various components, and are used only for the purpose of distinguishing one component from other components without limiting the components. For example, the second component may be referred to as the first component without departing from the scope of the present disclosure, and similarly, the first component may also be referred to as the second component. In addition, the terms such as " . . . unit", " . . . er", and "module" used in the specification refer to a unit that processes at least one function or operation, which may be implemented as hardware, software, or a combination of hardware and software. Further, the words "a or an", "one", "the", and similar words may be used to include both singular and plural terms in the context of describing the present disclosure (particularly in the context of the claims below), unless indicated otherwise or clearly contradicted by the context herein. In addition, when a component is referred to as being "coupled" or "connected" to another component, it means that the components may be coupled or connected logically or physically. In other words, a component may be directly coupled or connected to another component, but it should be understood that other components may exist between them and the components may be indirectly coupled or connected. Further, the terms used in the specification are only used to describe a specific embodiment and are not intended to limit the present disclosure. Singular expressions include plural expressions unless the context clearly indicates otherwise. In addition, It should be understood that the terms such as "include" or "have" used in the specification are intended to designate the presence of features, numbers, steps, operations, components, parts, or combinations thereof described in the specification, but are not intended to exclude in advance the presence or addition of one or more other features, numbers, steps, operations, components, parts, or combinations thereof.

Hereinafter, preferred embodiments of the present disclosure will be described in detail with reference to the accompanying drawings. It should be noted that in the accompanying drawings, identical components are indicated by identical symbols whenever possible. Further, detailed descriptions of well-known functions and configurations that may obscure the gist of the present disclosure will be omitted. For the same reason, in the accompanying drawings, some components are exaggerated, omitted, or schematically shown, and the size of each component does not entirely reflect the actual size. The embodiments described in the specification and the configurations shown in the drawings are only one of the most preferred embodiments of the present disclosure, and do not represent the entire technical idea of the present disclosure, so it should be understood that various equivalents and variations to replace them may exist at the time of filing the present application.

Figure 2:
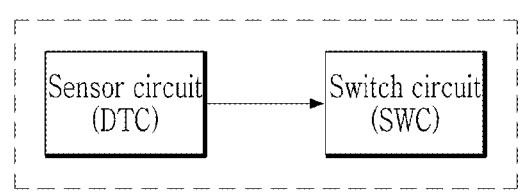
FIG. 2 is a diagram for explaining the detailed configuration of a switch module of a switch unit according to one embodiment of the present disclosure.

First, the overall configuration of an AC direct driving circuit device for uniformity of multi-channel light emitting diodes according to one embodiment of the present disclosure will be described. FIG. 1 is a diagram for explaining the configuration of the AC direct driving circuit device for uniformity of a multi-channel light emitting diode according to one embodiment of the present disclosure. FIG. 2 is a diagram for explaining the detailed configuration of a switch module of a switch unit according to one embodiment of the present disclosure.

Referring to FIG. 1, a driving circuit device 10 according to one embodiment of the present disclosure includes a power supply unit 100, a rectifier unit 200, a light emitting unit 300, a switch unit 400, a driving unit 500, and a distribution resistor unit 600.

The power supply unit 100 is for providing alternating current (AC) power, which is commercial power. That is, the power supply unit 100 provides AC power to the driving circuit device 10. According to one embodiment, the power supply unit 100 may be an AC voltage power supply Vac. The AC voltage power supply Vac applies AC voltage to the driving circuit device 10.

The rectifier unit 200 receives AC voltage from the power supply unit 100, rectifies the applied voltage, and provides the rectified voltage or current to the light emitting unit 300. In this case, the rectified voltage or current is not smoothed after being rectified, so the magnitude of the voltage or the amount of the current changes with time due to the characteristics of alternating current. The rectifier unit 200 may be configured as a diode bridge or bridge rectifier, but the rectifier unit 200 is not limited thereto and may use any type of circuit that can convert alternating current that changes in both positive and negative directions into a current that has only one direction.

The light emitting unit 300 includes a plurality of light emitting diodes (LEDs). According to one embodiment, the plurality of light emitting diodes include a first light emitting diode LED1, a second light emitting diode LED2, a third light emitting diode LED3, and a fourth light emitting diode LED4. The plurality of light emitting diodes LED1, LED2, LED3, LED4 are connected in series. The plurality of light emitting diodes LED1, LED2, LED3, LED4 of the light emitting unit 300 emit light by current according to the voltage applied by the power supply unit 100. In addition, the light emitting unit 300 further includes a plurality of diodes D. According to one embodiment, the plurality of diodes D includes a first diode D1, a second diode D2, and a third diode D3. As shown in the drawings, the first diode D1 is interposed between the first light emitting diode LED1 and the second light emitting diode LED2 and they are connected in series. The second diode D2 is interposed between the second light emitting diode LED2 and the third light emitting diode LED3 and they are connected in series. Likewise, the third diode D3 is interposed between the third light emitting diode LED3 and the fourth light emitting diode LED4 and they are connected in series.

The switch unit 400 includes a plurality of switch modules SW. The plurality of switch modules SW include a first switch module SW1, a second switch module SW2, and a third switch module SW3. The plurality of switch modules SW1, SW2, SW3 are formed on conductive lines connecting input nodes of two different light emitting diodes among the plurality of light emitting diodes LED1, LED2, LED3, LED4. As shown in the drawings, the first switch module SW1 is formed on a conductive line connecting an input node N1 of the first light emitting diode LED1 and an input node N3 of the third light emitting diode LED3. Further, the second switch module SW2 is formed on a conductive line connecting the input node N1 of the first light emitting diode LED1 and an input node N2 of the second light emitting diode LED2. In addition, the third switch module SW3 is formed on a conductive line connecting the input node N3 of the third light emitting diode LED3 and an input node N4 of the fourth light emitting diode LED4.

As shown in FIG. 2, the switch module SW (SW1, SW2, SW3) includes a sensor circuit DTC and a switch circuit SWC.

According to one embodiment of the present disclosure, the switch circuit SWC performs a switching function to open or short the conductive line on which the switch module SW (SW1, SW2, SW3) is formed by turning on or off. In particular, the switch circuit SWC opens or shorts the conductive lines formed by the switch module SW (SW1, SW2, SW3) by turning on or off according to a control signal from the sensor circuit DTC. The switch circuit SWC may be formed using a MOSFET (Metal-Oxide-Semiconductor Field-Effect Transistor) such as PMOS or NMOS. However, the switch circuit SWC is not limited to the above, and any device that performs the switching function may be used as the switch circuit SWC.

According to one embodiment of the present disclosure, the sensor circuit DTC detects the current flowing in any one of a plurality of light emitting diode channels LED CH, and outputs a control signal (0/1), such as a toggle signal and a flag signal, to the switch circuit SWC. Then, the switch circuit SWC turns on or turns off according to the control signal to open or short the conductive line on which the switch module SW (SW1, SW2, SW3) is formed.

The sensor circuit DTC includes a sensor circuit for detecting the current flowing in the corresponding light emitting diode channel LED CH. In this case, a first light emitting diode channel LED1 CH represents a path input to L1 of the driving unit 500 via the first light emitting diode LED1. A second light emitting diode channel LED2 CH represents a path input to L2 of the driving unit 500 via the second light emitting diode LED2. A third light emitting diode channel LED3 CH represents a path input to L3 of the driving unit 500 via the third light emitting diode LED3.

According to one embodiment, the sensor circuit DTC of the first switch module SW1 may detect the current flowing in the second light emitting diode channel LED2 CH. That is, the sensor circuit DTC of the first switch module SW1 may determine whether current flows through the path input to L2 of the driving unit 500 via the second light emitting diode LED2. Further, according to one embodiment, the sensor circuit DTC of the second switch module SW2 may detect the current flowing in the first light emitting diode channel LED1 CH. That is, the sensor circuit DTC of the second switch module SW2 may determine whether current flows through the path input to L1 of the driving unit 500 via the first light emitting diode LED1. In addition, according to one embodiment, the sensor circuit DTC of the third switch module SW3 may detect the current flowing in the third light emitting diode channel LED3 CH. That is, the sensor circuit DTC of the third switch module SW2 may determine whether current flows through the path input to L3 of the driving unit 500 via the third light emitting diode LED3.

According to one embodiment, the sensor circuit DTC of the first switch module SW1 detects the current flowing in the second light emitting diode channel LED2 CH and determines whether current flows in the second light emitting diode channel LED2 CH, that is, in the path input to L2 of the driving unit 500 via the second light emitting diode LED2. Accordingly, the sensor circuit DTC of the first switch module SW1 outputs 1 (High) when current flows through the second light emitting diode channel LED2 CH, and outputs 0 (Low) when no current flows through the second light emitting diode channel LED2 CH. Accordingly, when current flows through the second light emitting diode channel LED2 CH, the switch circuit SWC of the first switch module SW1 receives 1 as an input, and when 1 is input, it turns on to short the conductive line on which the first switch module SW1 is formed. On the other hand, when no current flows in the second light emitting diode channel LED2 CH, the switch circuit SWC of the first switch module SW1 receives 0 as an input, and when 0 is input, it turns off to open the conductive line on which the first switch module SW1 is formed.

According to one embodiment, the sensor circuit DTC of the second switch module SW2 detects the current flowing in the first light emitting diode channel LED1 CH and determines whether current flows in the first light emitting diode channel LED1 CH, that is, in the path input to L1 of the driving unit 500 via the first light emitting diode LED1. Accordingly, the sensor circuit DTC of the second switch module SW2 outputs 1 (High) when current flows through the first light emitting diode channel LED1 CH, and outputs 0 (Low) when no current flows through the first light emitting diode channel LED1 CH. Accordingly, when current flows through the first light emitting diode channel LED1 CH, the switch circuit SWC of the second switch module SW2 receives 1 as an input, and when 1 is input, it turns on to short the conductive line on which the second switch module SW2 is formed. On the other hand, when no current flows in the second light emitting diode channel LED2 CH, the switch circuit SWC of the second switch module SW2 receives 0 as an input, and when 0 is input, it turns off to open the conductive line on which the second switch module SW2 is formed.

According to one embodiment, the sensor circuit DTC of the third switch module SW3 detects the current flowing in the third light emitting diode channel LED3 CH and determines whether current flows in the third light emitting diode channel LED3 CH, that is, in the path input to L3 of the driving unit 500 via the third light emitting diode LED3. Accordingly, the sensor circuit DTC of the third switch module SW3 outputs 1 (High) when current flows through the third light emitting diode channel LED3 CH, and outputs 0 (Low) when no current flows through the third light emitting diode channel LED3 CH. Accordingly, when current flows through the third light emitting diode channel LED3 CH, the switch circuit SWC of the third switch module SW3 receives 1 as an input, and when 1 is input, it turns on to short the conductive line on which the third switch module SW3 is formed. On the other hand, when no current flows in the third light emitting diode channel LED3 CH, the switch circuit SWC of the third switch module SW3 receives 0 as an input, and when 0 is input, it turns off to open the conductive line on which the third switch module SW3 is formed.

According to another embodiment of the present disclosure, the sensor circuit DTC includes at least one sensor circuit for detecting current or voltage flowing in the node connected to the conductive line on which the switch module SW (SW1, SW2, SW3) is formed. The sensor circuit DTC may output a control signal to control the switch circuit SWC according to the detected voltage or current.

According to another embodiment, the sensor circuit DTC of the first switch module SW1 may detect a voltage applied to the input node N1 of the first light emitting diode LED1 or a current flowing in the input node N1 of the first light emitting diode LED1, or a voltage applied to the input node N3 of the third light emitting diode LED3 or a current flowing in the input node N3 of the third light emitting diode LED3. In particular, the sensor circuit DTC of the first switch module SW1 may determine whether current flows in the second diode D2 by detecting the current flowing in the input node N3 of the third light emitting diode LED3. Further, the sensor circuit DTC of the second switch module SW2 may detect a voltage applied to the input node N1 of the first light emitting diode LED1 or a current flowing in the input node N1 of the first light emitting diode LED1, or a voltage applied to the input node N2 of the second light emitting diode LED2 or a current flowing in the input node N2 of the second light emitting diode LED2. In particular, the sensor circuit unit DTC of the second switch module SW2 may determine whether current flows in the first diode D1 by detecting the current flowing in the input node N2 of the second light emitting diode LED2. In addition, the sensor circuit DTC of the third switch module SW3 may detect a voltage applied to the input node N3 of the third light emitting diode LED3 or a current flowing in the input node N3 of the third light emitting diode LED3, or a voltage applied to the input node N4 of the fourth light emitting diode LED4 or a current flowing in the input node N4 of the fourth light emitting diode LED4. In particular, the sensor circuit DTC of the third switch module SW3 may determine whether current flows in the third diode D3 by detecting the current flowing in the input node N4 of the fourth light emitting diode LED4.

The switch circuit SWC performs a switching function to open or short the conductive line on which the switch module SW (SW1, SW2, SW3) is formed by turning on or off. In particular, the switch circuit (SWC) opens or shorts the conductive line on which the switch module SW (SW1, SW2, SW3) is formed by turning on or off according to the control signal from the sensor circuit DTC. The switch circuit SWC may be formed using a MOSFET (Metal-Oxide-Semiconductor Field-Effect Transistor) such as PMOS or NMOS. However, the switch circuit SWC is not limited to the above, and any device that performs the switching function may be used as the switch circuit SWC.

According to another embodiment of the present disclosure, the sensor circuit DTC detects the current flowing in the diode, and outputs a control signal (0/1), such as a toggle signal and a flag signal, to the switch circuit SWC, and the switch circuit SWC turns on or turns off according to the control signal to open or short the conductive line on which the switch module SW (SW1, SW2, SW3) is formed.

According to another embodiment, the sensor circuit DTC of the first switch module SW1 detects the current flowing in the input node N3 of the third light emitting diode LED3 to determine whether current flows in the second diode D2, outputs 0 (Low) when current flows in the second diode D2, and outputs 1 (High) when no current flow in the second diode D2. Accordingly, when current flows through the second diode D2, the switch circuit SWC of the first switch module SW1 receives 0 as an input, and when 0 is input, it turns off to open the conductive line on which the first switch module SW1 is formed. On the other hand, when no current flows in the second diode D2, the switch circuit SWC of the first switch module SW1 receives 1 as an input, and when 1 is input, it turns on to short the conductive line the first switch module SW1 is formed.

Further, according to another embodiment, the sensor circuit DTC of the second switch module SW2 detects the current flowing in the input node N2 of the second light emitting diode LED2 to determine whether current flows in the first diode D1, outputs 0 when current flows in the first diode D1, and outputs 1 when no current flow in the first diode D1. Accordingly, when current flows through the first diode D1, the switch circuit SWC of the second switch module SW2 receives 0 as an input, and when 0 is input, it turns off to open the conductive line on which the second switch module SW2 is formed. On the other hand, when no current flows in the first diode D1, the switch circuit SWC of the second switch module SW2 receives 1 as an input, and when 1 is input, it turns on to short the conductive line the second switch module SW2 is formed.

In addition, according to another embodiment, the sensor circuit DTC of the third switch module SW3 may detect the current flowing in the input node N4 of the fourth light emitting diode LED4 to determine whether current flows in the third diode D3, output 0 when current flows in the third diode D3, and output 1 when no current flow in the third diode D3. Accordingly, when current flows through the third diode D3, the switch circuit SWC of the third switch module SW3 receives 0 as an input, and when 0 is input, it turns off to open the conductive line on which the third switch module SW3 is formed. On the other hand, when no current flows in the third diode D3, the switch circuit SWC of the third switch module SW3 receives 1 as an input, and when 1 is input, it turns on to short the conductive line the third switch module SW3 is formed.

Meanwhile, since the power supply unit 100 is an AC power source, the amount of input current increases and decreases with time. As described above, the plurality of switch modules SW (SW1, SW2, SW3) are turned on or off according to an increase or decrease in the amount of current. Accordingly, the wiring relationship of the plurality of light emitting diodes LED1, LED2, LED3, LED4, that is, serial connection, parallel connection, etc., is changed. In this way, when the wiring relationship of the plurality of light emitting diodes LED1, LED2, LED3, LED4 is changed, the path of the current may be branched or changed, and the amount of current flowing in the plurality of light emitting diodes LED1, LED2, LED3, LED4 may be changed.

The distribution resistance unit 600 includes a plurality of distribution resistors Rs for controlling the amount of current flowing in the plurality of light emitting diodes LED1, LED2, LED3, and LED4. According to one embodiment, the plurality of distribution resistors Rs include a first distribution resistor Rs1 and a second distribution resistor Rs2 connected in parallel to the ground. According to one embodiment, resistance values of the first distribution resistor Rs1 and the second distribution resistor Rs2 may be the same. According to another embodiment, the resistance value of the first distribution resistor Rs1 is preferably four times that of the second distribution resistor Rs2.

The driving unit 500 selectively connects the current flowing in each of the plurality of light emitting diodes LED1, LED2, LED3, LED4 to at least one of the distribution resistors Rs1, Rs2 so that the amount of current flowing in each of the plurality of light emitting diodes LED1, LED2, LED3, LED4 is adjusted. Since the magnitude of the voltage drop varies depending on the magnitudes of the connected distribution resistor Rs1, Rs2, the amount of current flowing in each of the plurality of light emitting diodes LED1, LED2, LED3, LED4 is determined. That is, the driving unit 500 controls the amount of current flowing in each of the first light emitting diode LED1, the second light emitting diode LED2, the third light emitting diode LED3, and the fourth light emitting diode LED4 by selectively connecting the current flowing in each of the first light emitting diode LED1, the second light emitting diode LED2, the third light emitting diode LED3, and the fourth light emitting diode LED4 to at least one of the first distribution resistor Rs1 and the second distribution resistor Rs2.

Figure 3:
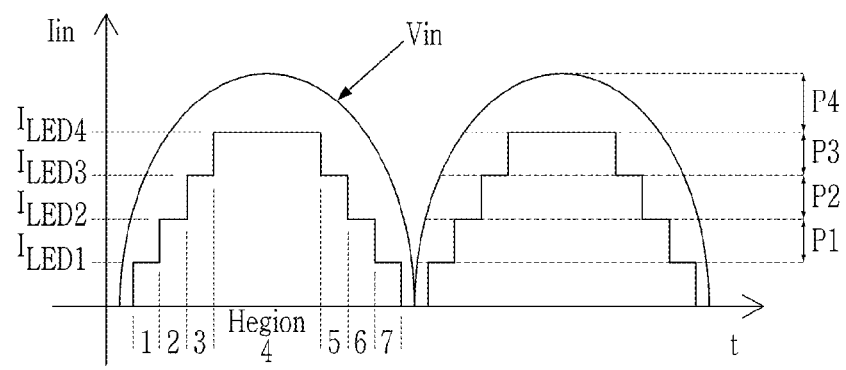
FIG. 3 is a graph to explain sections divided according to the input voltage and input current provided by an AC power source according to one embodiment of the present disclosure.

Next, the operation of the AC direct driving circuit device for uniformity of the multi-channel light emitting diodes above-described will be described. Basically, since the driving circuit device 10 of the present disclosure uses an AC power source, the input voltage and the input current vary with time. The present disclosure divides sections according to changes in the input voltage and the input current provided by the AC power source, and these sections will be described. FIG. 3 is a graph for explaining sections divided according to the input voltage and the input current provided by the AC power source according to one embodiment of the present disclosure.

The graph in FIG. 3 shows the characteristics of voltage and current input from the power supply unit 100 over time. As shown, the characteristics of the input voltage and the input current may be divided into four sections, that is, a first section P1, a second section P2, a third section P3, and a fourth section P4, depending on the magnitude of the input voltage Vin or the input current Iin.

In the first section P1, the voltage applied by the power supply unit 100, that is, the input voltage Vin, is greater than a driving voltage of the first light emitting diode LED1 and less than the sum of the driving voltage of the first light emitting diode LED1 and a driving voltage of the second light emitting diode LED2. In other words, in the first section P1, the input current Iin is also greater than a driving current of the first light emitting diode LED1 and less than the sum of the driving current of the first light emitting diode LED1 and a driving current of the second light emitting diode LED2.

In the second section P2, the input voltage Vin applied by the power supply unit 100 is greater than the sum of the driving voltages of the first light emitting diode LED1 and the second light emitting diode LED2 and less than the sum of the driving voltage of the first light emitting diode LED1, the driving voltage of the second light emitting diode LED2, and a driving voltage of the third light emitting diode LED3. In other words, in the second section P2, the input current Iin is greater than the sum of the driving currents of the first light emitting diode LED1 and the second light emitting diode LED2 and less than the sum of the driving current of the first light emitting diode LED1, the driving current of the second light emitting diode LED2, and a driving current of the third light emitting diode LED3.

In the third section P3, the input voltage Vin applied by the power supply unit 100 is greater than the sum of the driving voltages of the first light emitting diode LED1, the second light emitting diode LED2 and the third light emitting diode LED3 and less than the sum of the driving voltage of the first light emitting diode LED1, the driving voltage of the second light emitting diode LED2, the driving voltage of the third light emitting diode LED3, and a driving voltage of the fourth light emitting diode LED4. In other words, in the third section P2, the input current Iin is greater than the sum of the driving currents of the first light emitting diode LED1, the second light emitting diode LED2 and the third light emitting diode LED3 and less than the sum of the driving current of the first light emitting diode LED1, the driving current of the second light emitting diode LED2, the driving current of the third light emitting diode LED3, and a driving current of the fourth light emitting diode LED4.

In the fourth section P4, the input voltage Vin applied by the power supply unit 100 is greater than the sum of the driving voltages of the first light emitting diode LED1, the second light emitting diode LED2, the third light emitting diode LED3 and the fourth light emitting diode LED4. In other words, in the third section P2, the input current Iin is greater than the sum of the driving currents of the first light emitting diode LED1, the second light emitting diode LED2, the third light emitting diode LED3 and the fourth light emitting diode LED4.

As described above, since the driving circuit device 10 of the present disclosure uses the AC power source, the input voltage and the input current vary with time, and may be divided into a plurality of sections P1, P2, P3, P4 according to the variation. When the driving voltage or driving current of the plurality of light emitting diodes LED1, LED2, LED3, LED4 is the same, all the light emitting diodes LED1, LED2, LED3, LED4 operate in the plurality of sections P1, P2, P3, P4, and by changing the wiring relationship (series/parallel connection) of the first light emitting diode LED1, the second light emitting diode LED2, the third light emitting diode LED3, and the fourth light emitting diode LED4 adaptively to the variation of the input voltage or input current in each of the plurality of sections P1, P2, P3, P4 to allow the driving current to flow through all light emitting diodes LED1, LED2, LED3, LED4 so that the average of the current flowing in each of the light emitting diodes LED1, LED2, LED3, LED4 is the same, all the light emitting diodes LED1, LED2, LED3, LED4 operate and the amount of current flowing in each of the light emitting diodes LED1, LED2, LED3, LED4 is adjusted to make the brightness of all LEDs uniform.

Figure 4:
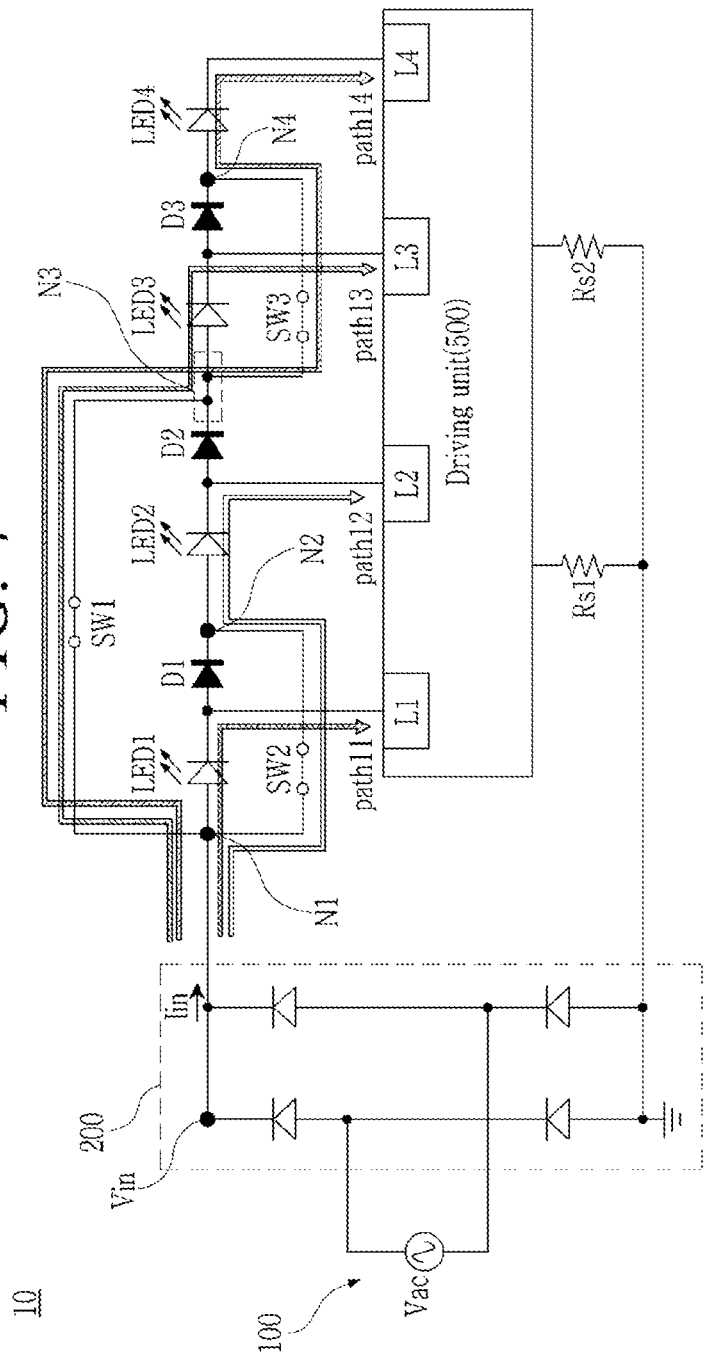
FIG. 4 is a diagram for explaining the operation of the driving circuit device when the input voltage and input current provided by the AC power source according to one embodiment of the present disclosure are in a first section.
Figure 5:
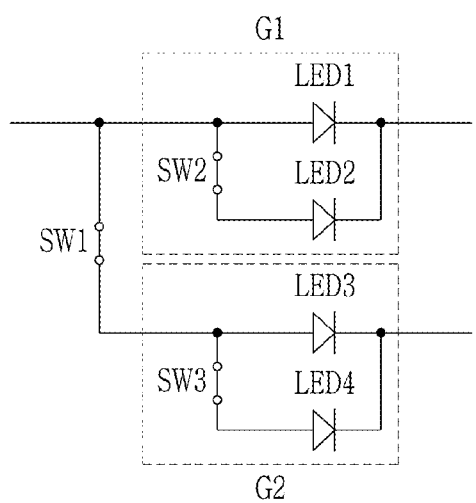
FIG. 5 is an equivalent circuit showing the wiring relationship of a plurality of light emitting diodes when the input voltage and input current provided by the AC power source according to one embodiment of the present disclosure are in the first section.

Then, the operation in each of the plurality of sections P1, P2, P3, P4 will be described in more detail. First, the operation of the driving circuit device 10 in the first section P1 will be described. FIG. 4 is a diagram for explaining the operation of the driving circuit device when the input voltage and the input current provided by the AC power source according to one embodiment of the present disclosure are in the first section. FIG. 5 is an equivalent circuit showing the wiring relationship of the plurality of light emitting diodes when the input voltage and the input current provided by the AC power source according to one embodiment of the present disclosure are in the first section.

Referring to FIGS. 3, 4, and 5, as described above, in the first section P1, the voltage Vin applied by the power supply unit 100 is greater than the driving voltage of the first light emitting diode LED1 and less than the sum of the driving voltages of the first light emitting diode LED1 and the second light emitting diode LED2. In the first section P1, as shown in FIG. 4, the first switch module SW1, the second switch module SW2, and the third switch module SW3 are all turned on by the switch unit 400.

According to one embodiment, the sensor circuit DTC of the first switch module SW1 determines whether current flows in the second light emitting diode channel LED2 CH, that is, in the path input to L2 of the driving unit 500 via the second light emitting diode LED2. Accordingly, when current flows in the second light emitting diode channel LED2 CH, the sensor circuit DTC of the first switch module SW1 outputs 1 (High). Then, the switch circuit SWC of the first switch module SW1 receives 1 as an input, and when 1 is input, it turns on to short the conductive line on which the first switch module SW1 is formed.

In addition, the sensor circuit DTC of the second switch module SW2 determines whether current flows in the first light emitting diode channel LED1 CH, that is, in the path input to L1 of the driving unit 500 via the first light emitting diode LED1. Accordingly, when current flows in the first light emitting diode channel LED1 CH, the sensor circuit DTC of the second switch module SW2 outputs 1 (High). Then, the switch circuit SWC of the second switch module SW2 receives 1 as an input, and when 1 is input, it turns on to short the conductive line on which the second switch module SW2 is formed. Further, the sensor circuit DTC of the third switch module SW3 determines whether current flows in the third light emitting diode channel LED3 CH, that is, in the path input to L3 of the driving unit 500 via the third light emitting diode LED3. Accordingly, when current flows in the third light emitting diode channel LED3 CH, the sensor circuit DTC of the third switch module SW3 outputs 1 (High). Then, the switch circuit SWC of the third switch module SW3 receives 1 as an input, and when 1 is input, it turns on to short the conductive line on which the third switch module SW3 is formed.

According to another embodiment, the sensor circuit DTC of the second switch module SW2 determines whether current flows in the first diode D1 by detecting the current flowing in the input node N2 of the second light emitting diode LED2. In the first section P1, the voltage applied to the first diode D1 is less than a threshold voltage of the first diode D1, and no current flows in the first diode D1. Accordingly, the sensor circuit DTC detects this and outputs 1. In this way, when no current flows in the first diode D1, the switch circuit SWC of the second switch module SW2 receives 1 as an input, and when 1 is input, it turns on to short the conductive line on which the second switch module SW2 is formed. In addition, the sensor circuit DTC of the first switch module SW1 determines whether current flows in the second diode D2 by detecting the current flowing in the input node N3 of the third light emitting diode LED3. In the first section P1, the voltage applied to the second diode D2 is less than a threshold voltage of the second diode D2, and no current flows in the second diode D2. Accordingly, the sensor circuit DTC detects this and outputs 1. In this way, when no current flows in the second diode D2, the switch circuit SWC of the first switch module SW1 receives 1 as an input, and when 1 is input, it turns on to short the conductive line on which the first switch module SW1 is formed. Further, the sensor circuit DTC of the third switch module SW3 determines whether current flows in the third diode D3 by detecting the current flowing in the input node N4 of the fourth light emitting diode LED4. In the first section P1, the voltage applied to the third diode D3 is less than a threshold voltage of the third diode D3, and no current flows in the third diode D3. Accordingly, the sensor circuit DTC detects this and outputs 1. In this way, when no current flows in the third diode D3, the switch circuit SWC of the third switch module SW3 receives 1 as an input, and when 1 is input, it turns on to short the conductive line on which the third switch module SW3 is formed.

As described above, when the first switch module SW1, the second switch module SW2, and the third switch module SW3 are all turned on, as shown in the equivalent circuit of FIG. 5, the first light emitting diode LED1 and the second light emitting diode LED2 are connected in parallel, and the third light emitting diode LED3 and the fourth light emitting diode LED4 are connected in parallel. In addition, a first group G1 including the first light emitting diode LED1 and the second light emitting diode LED2, and a second group G2 including the third light emitting diode LED3 and the fourth light emitting diode LED4 are connected in parallel.

Accordingly, in the first section P1, the input current Iin flows along first to fourth paths path 11, path 12, path 13, path 14 of the first section P1, as shown in FIG. 4. The first path path 11 is connected to the driving unit 500 from the input node N1 of the first light emitting diode LED1 through the first light emitting diode LED1. The second path path 12 is connected to the driving unit 500 from the input node N1 of the first light emitting diode LED1 through the second switch module SW2, the input node N2 of the second light emitting diode LED2, and the second light emitting diode LED2. The third path path 13 is connected to the driving unit 500 from the input node N1 of the first light emitting diode LED1 through the first switch module SW1, the input node N3 of the third light emitting diode LED3, and the third light emitting diode LED3. The fourth path path 14 is connected to the driving unit 500 from the input node N1 of the first light emitting diode LED1 through the first switch module SW1, the input node N3 of the third light emitting diode LED3, the third switch module SW3, the input node N4 of the fourth light emitting diode LED4, and the fourth light emitting diode LED4.

Then, the driving unit 500 connects the first path path 11 and the second path path 12, which are paths of current passing through the first group G1 including the first light emitting diode LED1 and the second light emitting diode LED2, to the first distribution resistor Rs1, and connects the third path path 13 and the fourth path path 14, which are paths of current passing through the second group G2 including the third light emitting diode LED3 and the fourth light emitting diode LED4, to the second distribution resistor Rs2. Then, the magnitude of the voltage drop is determined depending on the resistance value of each of the first distribution resistor Rs1 and the second distribution resistor Rs2, so that the amount of current flowing in each of the plurality of light emitting diodes LED1, LED2, LED3, LED4 can be adjusted.

Figure 6:
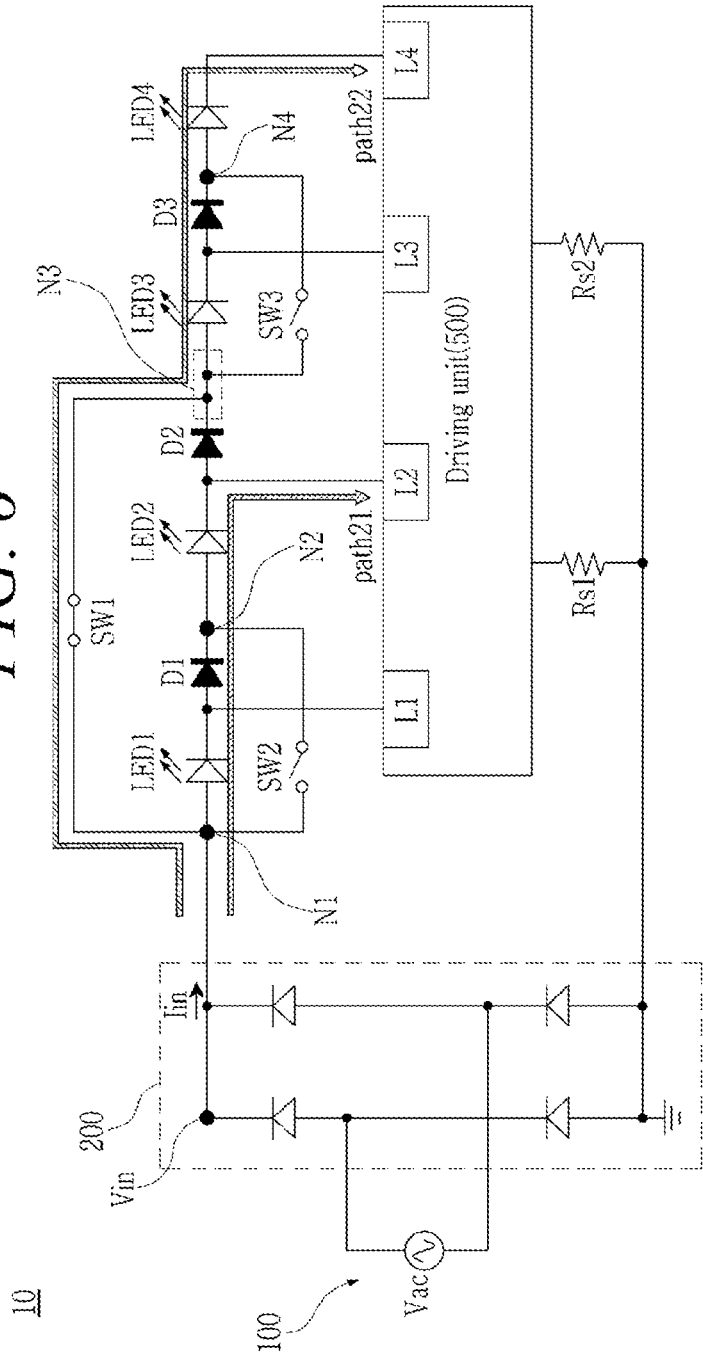
FIG. 6 is a diagram for explaining the operation of the driving circuit device when the input voltage and input current provided by the AC power source according to one embodiment of the present disclosure are in a second section.
Figure 7:
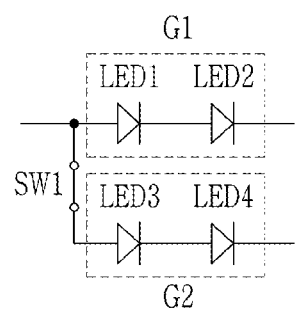
FIG. 7 is an equivalent circuit showing the wiring relationship of the plurality of light emitting diodes when the input voltage and input current provided by the AC power source according to one embodiment of the present disclosure are in the second section.

Next, the operation of the driving circuit device 10 in the second section P2 will be described. FIG. 6 is a diagram for explaining the operation of the driving circuit device when the input voltage and the input current provided by the AC power source according to one embodiment of the present disclosure are in the second section. FIG. 7 is an equivalent circuit showing the wiring relationship of the plurality of light emitting diodes when the input voltage and the input current provided by the AC power source according to one embodiment of the present disclosure are in the second section.

Referring to FIGS. 3, 6, and 7, as described above, in the second section P2, the voltage Vin applied by the power supply unit 100 is greater the sum of the driving voltages of the first light emitting diode LED1 and the second light emitting diode LED2 and less than the sum of the driving voltages of the first light emitting diode LED1, the second light emitting diode LED2 and the third light emitting diode LED3. In the second section P2, as shown in FIG. 6, by the switch unit 400, the first switch module SW1 is turned on, and the second switch module SW2 and the third switch module SW3 are turned off.

According to one embodiment, the sensor circuit DTC of the first switch module SW1 determines whether current flows in the second light emitting diode channel LED2 CH, that is, in the path input to L2 of the driving unit 500 via the second light emitting diode LED2. Accordingly, when current flows in the second light emitting diode channel LED2 CH, the sensor circuit DTC of the first switch module SW1 outputs 1 (High). Then, the switch circuit SWC of the first switch module SW1 receives 1 as an input, and when 1 is input, it turns on to short the conductive line on which the first switch module SW1 is formed. In addition, the sensor circuit DTC of the second switch module SW2 determines whether current flows in the first light emitting diode channel LED1 CH, that is, in the path input to L1 of the driving unit 500 via the first light emitting diode LED1. Accordingly, since no current flows in the first light emitting diode channel LED1 CH, the sensor circuit DTC of the second switch module SW2 outputs 0 (Low). Then, the switch circuit SWC of the second switch module SW2 receives 0 as an input, and when 0 is input, it turns off to open the conductive line on which the second switch module SW2 is formed. Further, the sensor circuit DTC of the third switch module SW3 determines whether current flows in the third light emitting diode channel LED3 CH, that is, in the path input to L3 of the driving unit 500 via the third light emitting diode LED3. Accordingly, since no current flows in the third light emitting diode channel LED3 CH, the sensor circuit DTC of the third switch module SW3 outputs 0 (Low). Then, the switch circuit SWC of the third switch module SW3 receives 0 as an input, and when 0 is input, it turns off to open the conductive line on which the third switch module SW3 is formed.

Meanwhile, according to another embodiment, the sensor circuit DTC of the second switch module SW2 determines whether current flows in the first diode D1 by detecting the current flowing in the input node N2 of the second light emitting diode LED2. In the second section P2, the voltage applied to the first diode D1 is greater than the threshold voltage of the first diode D1 and can drive even the second light emitting diode LED2, so that current flows in the first diode D1. Accordingly, the sensor circuit DTC of the second switch module SW2 detects this and outputs 0. In this way, when current flows in the first diode D1, the switch circuit SWC of the second switch module SW2 receives 0 as an input, and when 0 is input, it turns off to open the conductive line on which the second switch module SW2 is formed. In addition, the sensor circuit DTC of the first switch module SW1 determines whether current flows in the second diode D2 by detecting the current flowing in the input node N3 of the third light emitting diode LED3. In the second section P2, the voltage applied to the second diode D2 is less than the threshold voltage of the second diode D2, and no current flows in the second diode D2. Accordingly, the sensor circuit DTC detects this and outputs 1. In this way, when no current flows in the second diode D2, the switch circuit SWC of the first switch module SW1 receives 1 as an input, and when 1 is input, it turns on to short the conductive line on which the first switch module SW1 is formed. Further, the sensor circuit DTC of the third switch module SW3 determines whether current flows in the third diode D3 by detecting the current flowing in the input node N4 of the fourth light emitting diode LED4. In the second section P2, in the state in which the first switch module SW1 turns on to short the conductive line on which the first switch module SW1 is formed, the voltage applied to the third diode D3 is greater than the threshold voltage of the third diode D3 to drive even the fourth light emitting diode LED4, so that current flows in the third diode D3. Accordingly, the sensor circuit DTC of the third switch module SW3 detects this and outputs 0. In this way, when current flows in the third diode D3, the switch circuit SWC of the third switch module SW3 receives 0 as an input, and when 0 is input, it turns off to open the conductive line on which the third switch module SW3 is formed.

As described above, when the first switch module SW1 is turned on, and the second switch module SW2 and the third switch module SW3 are turned off, as shown in the equivalent circuit of FIG. 7, the first light emitting diode LED1 and the second light emitting diode LED2 are connected in series, and the third light emitting diode LED3 and the fourth light emitting diode LED4 are connected in series. In addition, the first group G1 including the first light emitting diode LED1 and the second light emitting diode LED2, and the second group G2 including the third light emitting diode LED3 and the fourth light emitting diode LED4 are connected in parallel.

Accordingly, in the second section P2, the input current Iin flows along first and second paths path 21, path 22 of the second section P2, as shown in FIG. 6. The first path path 21 is connected to the driving unit 500 from the input node N1 of the first light emitting diode LED1 through the first light emitting diode LED1, the first diode D1, the input node N2 of the second light emitting diode LED2, and the second light emitting diode LED2. The second path path 22 is connected to the driving unit 500 from the input node N1 of the first light emitting diode LED1 through the first switch module SW1, the input node N3 of the third light emitting diode LED3, the third light emitting diode LED3, the third diode D3, the input node N4 of the fourth light emitting diode LED4, and the fourth light emitting diode LED4.

Then, the driving unit 500 connects the first path path 21, which is a path of current passing through the first group G1 including the first light emitting diode LED1 and the second light emitting diode LED2, to the first distribution resistor Rs1, and connects the second path path 22, which is a path of current passing through the second group G2 including the third light emitting diode LED3 and the fourth light emitting diode LED4, to the second distribution resistor Rs2. Then, the magnitude of the voltage drop is determined depending on the resistance value of each of the first distribution resistor Rs1 and the second distribution resistor Rs2, so that the amount of current flowing in each of the plurality of light emitting diodes LED1, LED2, LED3, LED4 can be adjusted.

Figure 8:
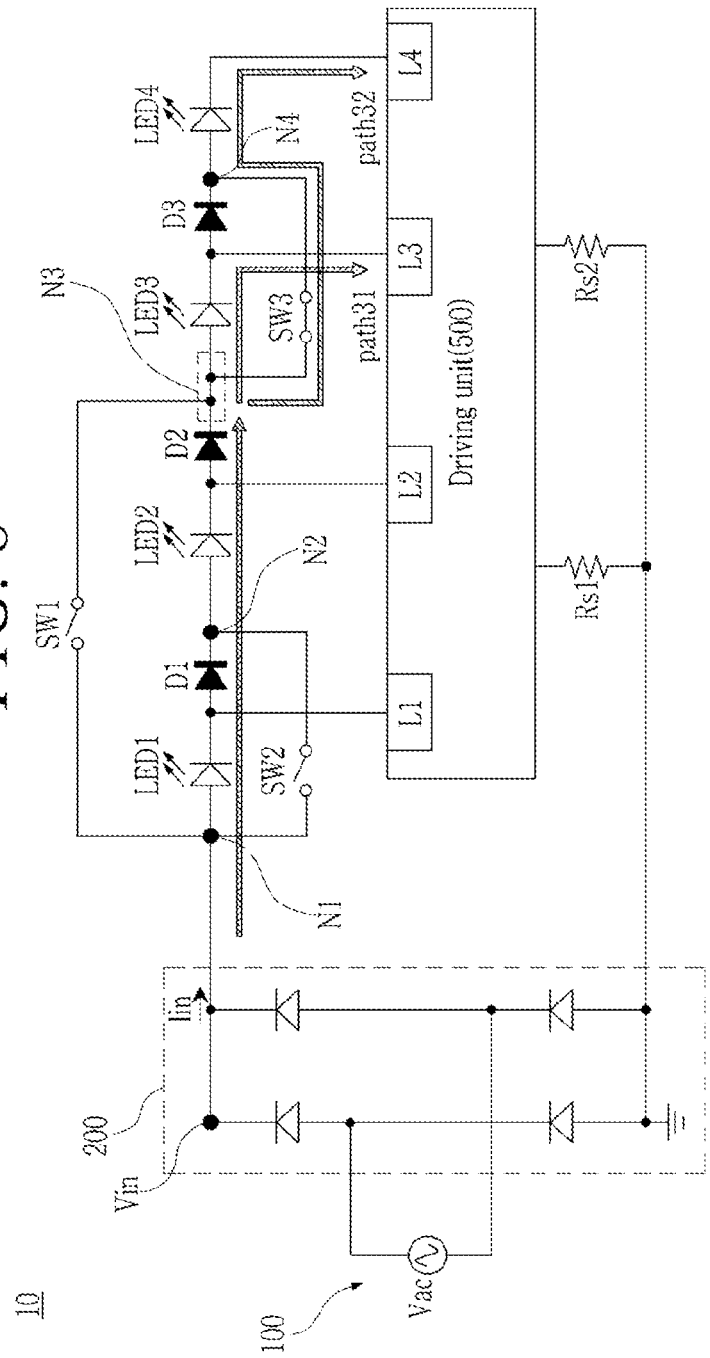
FIG. 8 is a diagram for explaining the operation of the driving circuit device when the input voltage and input current provided by the AC power source according to one embodiment of the present disclosure are in a third section.
Figure 9:
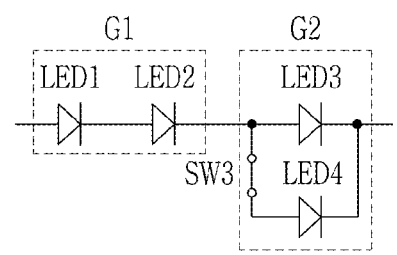
FIG. 9 is an equivalent circuit showing the wiring relationship of the plurality of light emitting diodes when the input voltage and input current provided by the AC power source according to one embodiment of the present disclosure are in the third section.

Next, the operation of the driving circuit device 10 in the third section P3 will be described. FIG. 8 is a diagram for explaining the operation of the driving circuit device when the input voltage and the input current provided by the AC power source according to one embodiment of the present disclosure are in the third section. FIG. 9 is an equivalent circuit showing the wiring relationship of the plurality of light emitting diodes when the input voltage and the input current provided by the AC power source according to one embodiment of the present disclosure are in the third section.

Referring to FIGS. 3, 8, and 9, as described above, in the third section P3, the voltage Vin applied by the power supply unit 100 is greater the sum of the driving voltages of the first light emitting diode LED1, the second light emitting diode LED2 and the third light emitting diode LED3 and less than the sum of the driving voltages of the first light emitting diode LED1, the second light emitting diode LED2, the third light emitting diode LED3 and the fourth light emitting diode LED4. In the third section P3, as shown in FIG. 8, by the switch unit 400, the third switch module SW3 is turned on, and the first switch module SW1 and the second switch module SW2 are turned off.

According to one embodiment, the sensor circuit DTC of the first switch module SW1 determines whether current flows in the second light emitting diode channel LED2 CH, that is, in the path input to L2 of the driving unit 500 via the second light emitting diode LED2. Accordingly, since no current flows in the second light emitting diode channel LED2 CH, the sensor circuit DTC of the first switch module SW1 outputs 0 (Low). Then, the switch circuit SWC of the first switch module SW1 receives 0 as an input, and when 0 is input, it turns off to open the conductive line on which the first switch module SW1 is formed. In addition, the sensor circuit DTC of the second switch module SW2 determines whether current flows in the first light emitting diode channel LED1 CH, that is, in the path input to L1 of the driving unit 500 via the first light emitting diode LED1. Accordingly, since no current flows in the first light emitting diode channel LED1 CH, the sensor circuit DTC of the second switch module SW2 outputs 0 (Low). Then, the switch circuit SWC of the second switch module SW2 receives 0 as an input, and when 0 is input, it turns off to open the conductive line on which the second switch module SW2 is formed. Further, the sensor circuit DTC of the third switch module SW3 determines whether current flows in the third light emitting diode channel LED3 CH, that is, in the path input to L3 of the driving unit 500 via the third light emitting diode LED3. Accordingly, since current flows in the third light emitting diode channel LED3 CH, the sensor circuit DTC of the third switch module SW3 outputs 1 (High). Then, the switch circuit SWC of the third switch module SW3 receives 1 as an input, and when 1 is input, it turns on to short the conductive line on which the third switch module SW3 is formed.

Meanwhile, according to another embodiment, the sensor circuit DTC of the second switch module SW2 determines whether current flows in the first diode D1 by detecting the current flowing in the input node N2 of the second light emitting diode LED2. In the third section P3, the voltage applied to the first diode D1 is greater than the threshold voltage of the first diode D1 enough to drive the third light emitting diode LED3, so that current flows in the first diode D1. Accordingly, the sensor circuit DTC of the second switch module SW2 detects this and outputs 0. In this way, when current flows in the first diode D1, the switch circuit SWC of the second switch module SW2 receives 0 as an input, and when 0 is input, it turns off to open the conductive line on which the second switch module SW2 is formed. In addition, the sensor circuit DTC of the first switch module SW1 determines whether current flows in the second diode D2 by detecting the current flowing in the input node N3 of the third light emitting diode LED3. In the third section P3, the voltage applied to the second diode D2 is greater than the threshold voltage of the second diode D2 enough to drive the third light emitting diode LED3, so that current flows in the second diode D2 in the third section P3. Accordingly, the sensor circuit DTC detects this and outputs 0. In this way, when current flows in the second diode D2, the switch circuit SWC of the first switch module SW1 receives 0 as an input, and when 0 is input, it turns off to open the conductive line on which the first switch module SW1 is formed. Further, the sensor circuit DTC of the third switch module SW3 determines whether current flows in the third diode D3 by detecting the current flowing in the input node N4 of the fourth light emitting diode LED4. In the third section P3, in the state in which the first switch module SW1 turns off to open the conductive line on which the first switch module SW1 is formed, the voltage applied to the third diode D3 is less than the threshold voltage of the third diode D3, so that no current flows in the third diode D3. Accordingly, the sensor circuit DTC of the third switch module SW3 detects this and outputs 1. In this way, when no current flows in the third diode D3, the switch circuit SWC of the third switch module SW3 receives 1 as an input, and when 1 is input, it turns on to short the conductive line on which the third switch module SW3 is formed.

As described above, when the third switch module SW3 is turned on, and the first switch module SW1 and the second switch module SW2 are turned off, as shown in the equivalent circuit of FIG. 9, the first light emitting diode LED1 and the second light emitting diode LED2 are connected in series, and the third light emitting diode LED3 and the fourth light emitting diode LED4 are connected in parallel. In addition, the first group G1 including the first light emitting diode LED1 and the second light emitting diode LED2, and the second group G2 including the third light emitting diode LED3 and the fourth light emitting diode LED4 are connected in series.

Accordingly, in the third section P3, the input current Iin flows along first and second paths path 31, path 32 of the third section P3, as shown in FIG. 8. The first path path 31 is connected to the driving unit 500 from the input node N1 of the first light emitting diode LED1 through the first light emitting diode LED1, the first diode D1, the input node N2 of the second light emitting diode LED2, the second light emitting diode LED2, the second diode D2, the input node N3 of the third light emitting diode LED3, and the third light emitting diode LED3. The second path path 22 is connected to the driving unit 500 from the input node N1 of the first light emitting diode LED1 through the first light emitting diode LED1, the first diode D1, the input node N2 of the second light emitting diode LED2, the second light emitting diode LED2, the second diode D2, the input node N3 of the third emitting diode LED3, the third switch module SW3, the input node N4 of the fourth light emitting diode LED4, and the fourth light emitting diode LED4.

Then, the driving unit 500 may connect both the first path path 31, which is a path of current passing through the first light emitting diode LED1, the second light emitting diode LED2 and the third light emitting diode LED3, and the second path path 32, which is a path of current passing through the first light emitting diode LED1, the second light emitting diode LED2 and the fourth light emitting diode LED4, to at least one of the first distribution resistor Rs1 and the second distribution resistor Rs2. According one embodiment, the driving unit 500 connects both the first path path 31 and the second path path 32 to the second distribution resistor Rs2.

Meanwhile, when the magnitudes of the first distribution resistor Rs1 and the second distribution resistor Rs2 are the same, the amount of the current flowing in the third light emitting diode LED3 and the fourth light emitting diode LED4 will be half of the current flowing in the first light emitting diode LED1 and the second light emitting diode LED2. However, when the first distribution resistor Rs1 having a resistance value greater than that of the second distribution resistor Rs2 is used, the amount of current flowing along the first path path 11 and the second path path 12 of the first section P1 and along the first path path 21 of the second section P2 described above decreases, so that the average current flowing in the first to fourth light emitting diodes LED1 to LED4 in the first to fourth sections can be the same. According to one embodiment, the first distribution resistor Rs1 may be a resistor having a resistance value four times that of the second distribution resistor Rs2.

Figure 10:
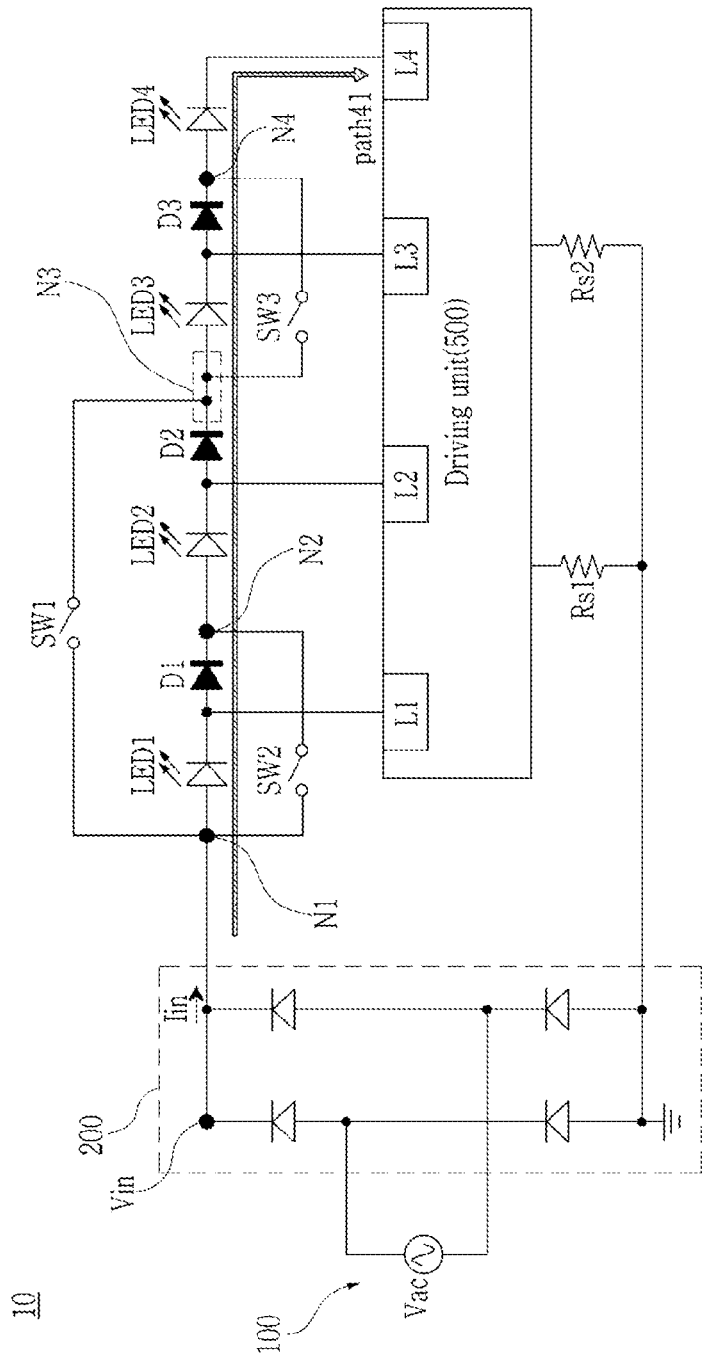
FIG. 10 is a diagram for explaining the operation of the driving circuit device when the input voltage and input current provided by the AC power source according to one embodiment of the present disclosure are in a fourth section.
Figure 11:
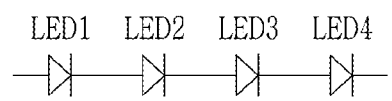
FIG. 11 is an equivalent circuit showing the wiring relationship of a plurality of light emitting diodes when the input voltage and input current provided by the AC power source according to one embodiment of the present disclosure are in the fourth section.

Next, the operation of the driving circuit device 10 in the fourth section P4 will be described. FIG. 10 is a diagram for explaining the operation of the driving circuit device when the input voltage and the input current provided by the AC power source according to one embodiment of the present disclosure are in the fourth section. FIG. 11 is an equivalent circuit showing the wiring relationship of the plurality of light emitting diodes when the input voltage and the input current provided by the AC power source according to one embodiment of the present disclosure are in the fourth section.

Referring to FIGS. 3, 10, and 11, as described above, in the fourth section P4, the voltage Vin applied by the power supply unit 100 is greater the sum of the driving voltages of the first light emitting diode LED1, the second light emitting diode LED2, the third light emitting diode LED3 and the fourth light emitting diode LED4. In the fourth section P4, as shown in FIG. 10, by the switch unit 400, the first switch module SW1, the second switch module SW2 and the third switch module SW3 are all turned off.

According to one embodiment, the sensor circuit DTC of the first switch module SW1 determines whether current flows in the second light emitting diode channel LED2 CH, that is, in the path input to L2 of the driving unit 500 via the second light emitting diode LED2. Accordingly, since no current flows in the second light emitting diode channel LED2 CH, the sensor circuit DTC of the first switch module SW1 outputs 0 (Low). Then, the switch circuit SWC of the first switch module SW1 receives 0 as an input, and when 0 is input, it turns off to open the conductive line on which the first switch module SW1 is formed. In addition, the sensor circuit DTC of the second switch module SW2 determines whether current flows in the first light emitting diode channel LED1 CH, that is, in the path input to L1 of the driving unit 500 via the first light emitting diode LED1. Accordingly, since no current flows in the first light emitting diode channel LED1 CH, the sensor circuit DTC of the second switch module SW2 outputs 0 (Low). Then, the switch circuit SWC of the second switch module SW2 receives 0 as an input, and when 0 is input, it turns off to open the conductive line on which the second switch module SW2 is formed. Further, the sensor circuit DTC of the third switch module SW3 determines whether current flows in the third light emitting diode channel LED3 CH, that is, in the path input to L3 of the driving unit 500 via the third light emitting diode LED3. Accordingly, since no current flows in the third light emitting diode channel LED3 CH, the sensor circuit DTC of the third switch module SW3 outputs 0 (Low). Then, the switch circuit SWC of the third switch module SW3 receives 0 as an input, and when 0 is input, it turns off to open the conductive line on which the third switch module SW3 is formed.

Meanwhile, according to another embodiment, the sensor circuit DTC of the second switch module SW2 determines whether current flows in the first diode D1 by detecting the current flowing in the input node N2 of the second light emitting diode LED2. In the fourth section P4, the voltage applied to the first diode D1 is sufficiently greater than the threshold voltage of the first diode D1 enough to drive the fourth light emitting diode LED4, so that current flows in the first diode D1. Accordingly, the sensor circuit DTC of the second switch module SW2 detects this and outputs 0. In this way, when current flows in the first diode D1, the switch circuit SWC of the second switch module SW2 receives 0 as an input, and when 0 is input, it turns off to open the conductive line on which the second switch module SW2 is formed. In addition, the sensor circuit DTC of the first switch module SW1 determines whether current flows in the second diode D2 by detecting the current flowing in the input node N3 of the third light emitting diode LED3. In the fourth section P4, the voltage applied to the second diode D2 is sufficiently greater than the threshold voltage of the second diode D2 enough to drive the fourth light emitting diode LED4, so that current flows in the second diode D2 in the fourth section P4. Accordingly, the sensor circuit DTC detects this and outputs 0. In this way, when current flows in the second diode D2, the switch circuit SWC of the first switch module SW1 receives 0 as an input, and when 0 is input, it turns off to open the conductive line on which the first switch module SW1 is formed. Further, the sensor circuit DTC of the third switch module SW3 determines whether current flows in the third diode D3 by detecting the current flowing in the input node N4 of the fourth light emitting diode LED4. In the fourth section P4, in the state in which the first switch module SW1 turns off to open the conductive line on which the first switch module SW1 is formed, the voltage applied to the third diode D3 is greater than the threshold voltage of the third diode D3 enough to drive the fourth light emitting diode LED4, so that current flows in the third diode D3. Accordingly, the sensor circuit DTC of the third switch module SW3 detects this and outputs 0. In this way, when current flows in the third diode D3, the switch circuit SWC of the third switch module SW3 receives 0 as an input, and when 0 is input, it turns off to open the conductive line on which the third switch module SW3 is formed.

As described above, when the first switch module SW1, the second switch module SW2, and the third switch module SW3 are all turned off, as shown in the equivalent circuit of FIG. 11, the first light emitting diode LED1, the second light emitting diode LED2, the third light emitting diode LED3 and the fourth light emitting diode LED4 are sequentially connected in series.

Accordingly, in the fourth section P4, the input current Iin flows along a first path path 41 of the fourth section P4, as shown in FIG. 10. The first path path 41 is connected to the driving unit 500 from the input node N1 of the first light emitting diode LED1 through the first light emitting diode LED1, the first diode D1, the input node N2 of the second light emitting diode LED2, the second light emitting diode LED2, the second diode D2, the input node N3 of the third light emitting diode LED3, the third light emitting diode LED3, the third diode D3, the input node N4 of the fourth light emitting diode LED4, and the fourth light emitting diode LED4.

Then, the driving unit 500 may connect the first path path 41, which is a path of current passing through the first light emitting diode LED1, the second light emitting diode LED2, the third light emitting diode LED3, and the third light emitting diode LED3, to at least one of the first distribution resistor Rs1 and the second distribution resistor Rs2. According one embodiment, the driving unit 500 connects both the first path path 41 to the second distribution resistor Rs2. Then, the magnitude of the voltage drop is determined depending on the resistance value of each of the first distribution resistor Rs1 and the second distribution resistor Rs2, so that the amount of current flowing in each of the plurality of light emitting diodes LED1, LED2, LED3, LED4 can be adjusted.

Figure 12:
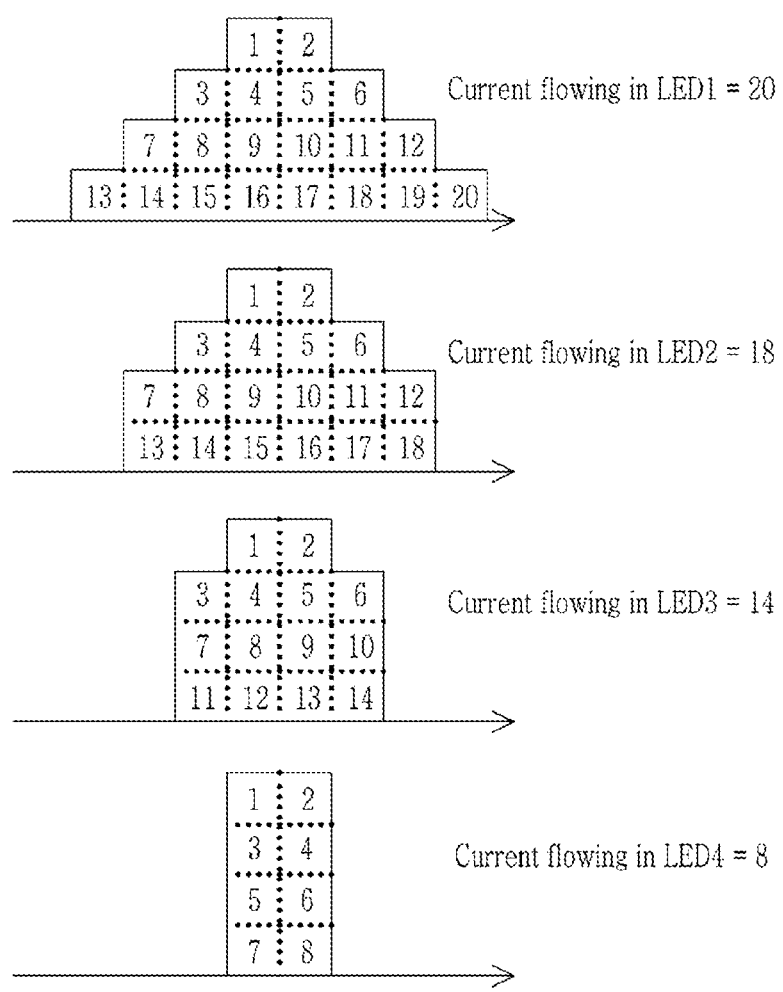
FIG. 12 is a graph showing the current flowing in each light emitting diode for each section of input voltage in a conventional AC direct driving circuit device.
Figure 13:
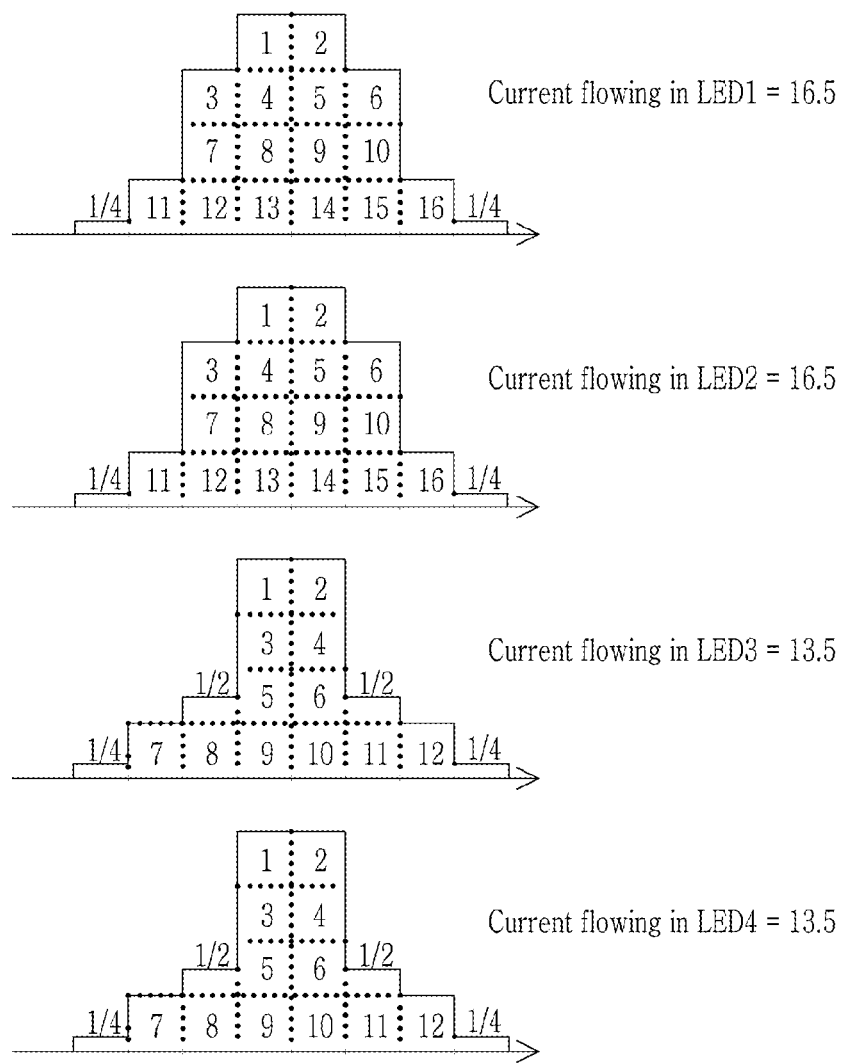
FIG. 13 is a graph showing the current flowing in each light emitting diode for each section of the input voltage when resistance values of a first distribution resistor and a second distribution resistor are the same according to one embodiment of the present disclosure.

Next, the amount of current flowing in the light emitting diode for each section of input voltage according to one embodiment of the present disclosure will be explained in comparison with the prior art. FIG. 12 is a graph showing the current flowing in each light emitting diode for each section of input voltage in a conventional AC direct driving circuit device. FIG. 13 is a graph showing the current flowing in each light emitting diode for each section of input voltage when the resistance values of the first distribution resistor and the second distribution resistor are the same according to one embodiment of the present disclosure. Further, FIG. 14 is a graph showing the current flowing in each light emitting diode for each section of the input voltage when the resistance value of the first distribution resistor is four times the resistance value of the second distribution resistor according to another embodiment of the present disclosure.

As shown in FIG. 12, according to the prior art, the amount of current flowing in each of the first light emitting diode LED1, the second light emitting diode LED2, the third light emitting diode LED3, and the fourth light emitting diode LED4 decreases sequentially to 20, 18, 14, and 8. Comparing only the amount of current flowing in the first light emitting diode LED1 and the fourth light emitting diode LED4, it can be seen that there is a difference of more than two times (20:8) and they do not operate evenly.

On the other hand, referring to FIG. 13, when the resistance values of the first distribution resistor and the second distribution resistor are the same according to one embodiment of the present disclosure, the amounts of current flowing in the first light emitting diode LED1, the second light emitting diode LED2, the third light emitting diode LED3, and the fourth light emitting diode LED4 are 16.5, 16.5, 13.5, and 13.5, respectively. According to this embodiment, it can be seen that the amounts of current flowing in the first light emitting diode LED1 and the second light emitting diode LED2 are the same, and the amount of current flowing in the first light emitting diode LED1 is about 22% (16.5/13.5) more than that of the third light emitting diode LED3 or the fourth light emitting diode LED4, but the difference is not significant.

Figure 14:
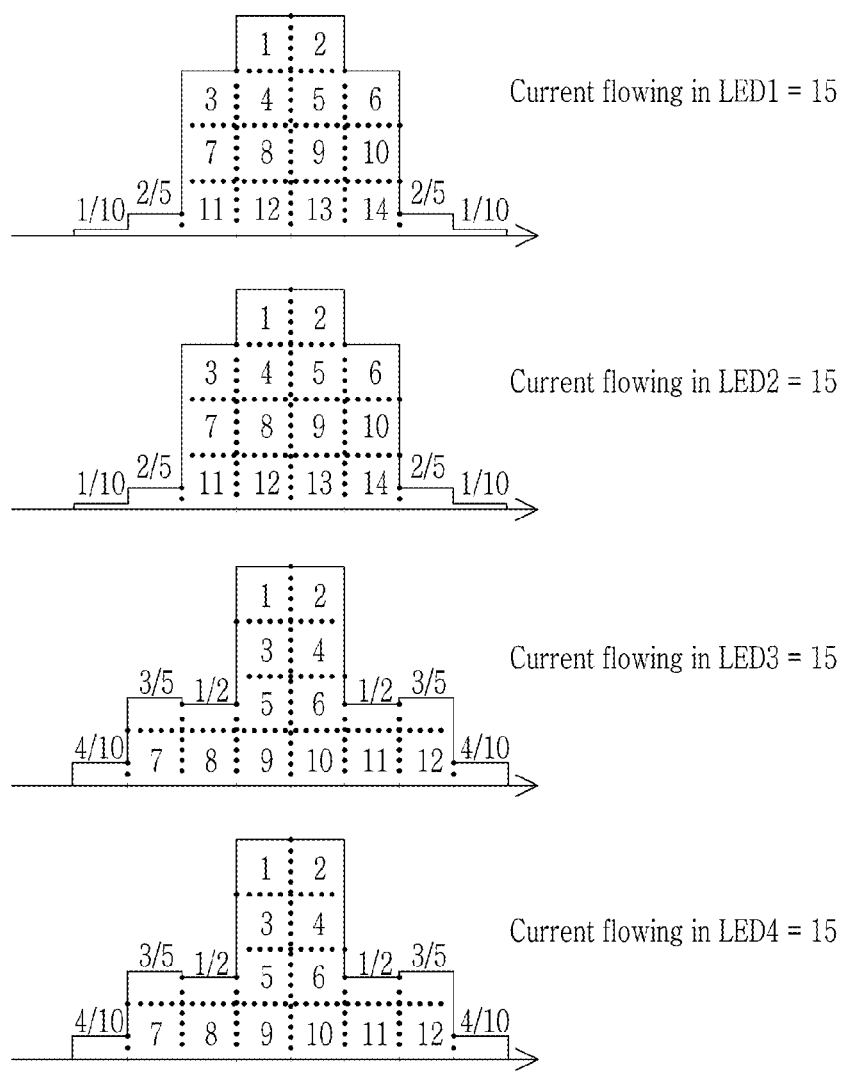
FIG. 14 is a graph showing the current flowing in each light emitting diode for each section of the input voltage when the resistance value of the first distribution resistor is four times the resistance value of the second distribution resistor according to another embodiment of the present disclosure.

In particular, referring to FIG. 14, according to another embodiment of the present disclosure, when the resistance value of the first distribution resistor is four times the resistance value of the second distribution resistor (Rs1=4× Rs2), the amount of current flowing in each of the first light emitting diode LED1, the second light emitting diode LED2, the third light emitting diode LED3, and the fourth light emitting diode LED4 is equal to 15. In this way, the present disclosure can achieve the same brightness by flowing the same amount of current through all light emitting diode channels.

Meanwhile, the method according to the embodiment of the present disclosure described above may be implemented in the form of a program readable through various computer means and recorded on a computer-readable recording medium. In this case, the recording medium may include program instructions, data files, data structures, etc., singly or in combination. The program instructions recorded on the recording medium may be those specifically designed and constructed for the present disclosure, or may be known and available to those skilled in the art of computer software. For example, the recording medium includes magnetic media such as hard disks, floppy disks, and magnetic tapes, optical media such as CD-ROMs and DVDs, and magneto-optical media such as floptical disks, and hardware devices specially configured to store and execute program instructions, such as ROM, RAM, and flash memory. Examples of the program instructions may include not only machine language, such as that created by a compiler, but also high-level languages that can be executed by a computer using an interpreter, etc. The hardware device may be configured to operate as one or more software modules to perform the operations of the present disclosure, and vice versa.

Although the present disclosure has been described above using several preferred embodiments, these embodiments are exemplary and not limiting. As such, those of ordinary skill in the art to which the present disclosure pertains will understand that various changes and modifications can be made according to the theory of equivalents without departing from the idea of the present disclosure and the scope set forth in the appended claims.

What is claimed is:

1. An AC (alternating current) direct driving circuit device for uniformity of multi-channel light emitting diodes, the AC direct driving circuit device comprises:
    a power supply unit that applies an AC voltage;
    a light emitting unit including a plurality of light emitting diodes which are connected in series and emit light by current according to the voltage applied by the power supply unit wherein the plurality of light emitting diodes include a first light emitting diode, a second light emitting diode, a third light emitting diode, and a fourth light emitting diode, and the light emitting unit comprising:
        a first diode interposed between the first light emitting diode and the second light emitting diode;
        a second diode interposed between the second light emitting diode and the third light emitting diode; and
        a third diode interposed between the third light emitting diode and the fourth light emitting diode;
    a switch unit including a plurality of switch modules which are formed on a plurality of conductive lines connecting input nodes of two different light emitting diodes among the plurality of light emitting diodes and distribute an amount of the current flowing in each of the light emitting diodes by turning on or off according to an increase or decrease in the amount of the current and wherein the plurality of switch modules comprise:
        a first switch module formed on a conductive line connecting an input node of the first light emitting diode and an input node of the third light emitting diode;
        a second switch module formed on a conductive line connecting the input node of the first light emitting diode and an input node of the second light emitting diode; and
        a third switch module formed on a conductive line connecting the input node of the third light emitting diode and an input node of the fourth light emitting diode;
    a distribution resistance unit including a plurality of distribution resistors for distributing the amount of the current; and
    a driving unit that controls the amount of the current flowing in each of the plurality of light emitting diodes by selectively connecting the current flowing in each of the plurality of light emitting diodes to at least one of the plurality of distribution resistors.

2. The driving circuit device of claim 1, wherein in a first section where the voltage applied by the power supply is greater than a driving voltage of the first light emitting diode and less than a sum of the driving voltage of the first light emitting diode and a driving voltage of the second light emitting diode, the first switch module, the second switch module and the third switch modules are all turned on, so that the first light emitting diode and the second light emitting diode are connected in parallel, the third light emitting diode and the fourth light emitting diode are connected in parallel, and a first group including the first light emitting diode and the second light emitting diode and a second group including the third light emitting diode and the fourth light emitting diode are connected in parallel.

3. The driving circuit device of claim 1, wherein in a second section where the voltage applied by the power supply is greater than a sum of driving voltages of the first light emitting diode and the second light emitting diode and less than a sum of the driving voltage of the first light emitting diode, the driving voltage of the second light emitting diode and a driving voltage of the third light emitting diode, the first switch module and the third switch modules are turned on and the second switch module is turned off, so that the first light emitting diode and the second light emitting diode are connected in series, the third light emitting diode and the fourth light emitting diode are connected in series, and a first group including the first light emitting diode and the second light emitting diode and a second group including the third light emitting diode and the fourth light emitting diode are connected in parallel.

4. The driving circuit device of claim 1, wherein in a third section where the voltage applied by the power supply is greater than a sum of driving voltages of the first light emitting diode, the second light emitting diode and the third light emitting diode and less than a sum of the driving voltage of the third light emitting diode and a driving voltage of the fourth light emitting diode, the third switch module is turned on and the first switch module and the second switch modules are turned off, so that the first light emitting diode and the second light emitting diode are connected in series, the third light emitting diode and the fourth light emitting diode are connected in parallel, and a first group including the first light emitting diode and the second light emitting diode and a second group including the third light emitting diode and the fourth light emitting diode are connected in series.

5. The driving circuit device of claim 1, wherein in a fourth section where the voltage applied by the power supply is greater than a sum of driving voltages of the first light emitting diode, the second light emitting diode, the third light emitting diode and the fourth light emitting diode, the first switch module, the second switch module and the third switch modules are all turned off, so that the first light emitting diode, the second light emitting diode, the third light emitting diode and the fourth light emitting diode are subsequently connected in series.

6. The driving circuit device of claim 1, wherein the distribution resistor unit includes a first distribution resistor and a second distribution resistor connected in parallel with each other to ground, and the driving unit controls the current flowing in each of the first light emitting diode, the second light emitting diode, the third light emitting diode, and the fourth light emitting diode to be selectively connected to at least one of the first distribution resistor and the second distribution resistor to control an amount of the current flowing in each of the first light emitting diode, the second light emitting diode, the third light emitting diode, and the fourth light emitting diode.

7. The driving circuit device of claim 6, wherein resistance values of the first distribution resistor and the second distribution resistor are the same.

8. The driving circuit device of claim 6, wherein a resistance value of the first distribution resistor is four times a resistance value of the second distribution resistor.

9. The driving circuit device of claim 1, further comprising:

a rectifier unit that rectifies the AC voltage and provides the rectified voltage to the light emitting unit.

* * * * *